US012693834B1

(12) United States Patent     (10) Patent No.:    US 12,693,834 B1

Faenger et al.                   (45) Date of Patent:      Jul. 28, 2026

(54) CONTEXT-AWARE CODE GENERATION USING SYNTAX TREE MODIFICATION AND LEVEL-OF-DETAIL PROCESSING

(71) Applicant: With Woz, Inc., San Francisco, CA (US)

(72) Inventors: Jens Faenger, Lakewood Ranch, FL (US); Thorsten Kuehnemund, Scotts Valley, CA (US); Redi Kurti, Santa Clara, CA (US); Bradley Michael Eckert, San Francisco, CA (US); Benjamin Taylor Collins, San Francisco, CA (US)

(73) Assignee: With Woz, Inc., San Francisco, CA (US)

( * ) Notice: Subject to any disclaimer, the term of this patent is extended or adjusted under 35 U.S.C. 154(b) by 0 days.

(21) Appl. No.: 19/413,868

(22) Filed: Dec. 9, 2025

Related U.S. Application Data

(63) Continuation of application No. 19/320,770, filed on Sep. 5, 2025, now Pat. No. 12,578,930.

(60) Provisional application No. 63/811,276, filed on May 23, 2025.

(51) Int. Cl.
     *G06F 8/30*         (2018.01)

(52) U.S. Cl.
     CPC ...................................... *G06F 8/30* (2013.01)

(58) Field of Classification Search
     CPC ...................................................... G06F 8/30
     See application file for complete search history.

(56) References Cited

U.S. PATENT DOCUMENTS

| | | | |
|---|---|---|---|
| 12,197,859 B1 * | 1/2025 | Malviya | G06F 40/216 |
| 12,292,811 B1 * | 5/2025 | Deb | G06F 8/41 |
| 12,340,191 B1 * | 6/2025 | Serban | G06N 3/08 |
| 2023/0016897 A1 * | 1/2023 | Manivasagam | G06F 8/10 |
| 2023/0244452 A1 * | 8/2023 | Li | G06F 8/30 |
| | | | 717/106 |
| 2024/0411674 A1 * | 12/2024 | Zmigrod | G06F 11/3684 |
| 2025/0005026 A1 * | 1/2025 | Balasubramanian | |
| | | | G06F 16/24578 |
| 2025/0094138 A1 * | 3/2025 | Hu | G06F 40/226 |
| 2025/0181325 A1 * | 6/2025 | Leblond | G06N 3/08 |
| 2025/0291554 A1 * | 9/2025 | Schornig | G06F 11/3684 |
| 2025/0306870 A1 * | 10/2025 | Hendricks | G06F 8/40 |
| 2025/0315223 A1 * | 10/2025 | Chlipala | G06F 8/34 |
| 2025/0342108 A1 * | 11/2025 | Griffin | G06F 11/3604 |

(Continued)

*Primary Examiner* — Douglas M Slachta

(74) *Attorney, Agent, or Firm* — Schwegman Lundberg & Woessner, P.A.

(57)               ABSTRACT

A method comprises generating a map of relationships between functions, statements and data structures in identified code by traversing a syntax tree for the identified code, the syntax tree for the identified code includes a hierarchy of nodes, each node comprising at least one identifying name; modifying nodes of the syntax tree of the identified node by truncating code unrelated to the code generation task to generate a modified syntax tree for the identified code; adding to the modified syntax tree, for each modified node, a new node indicating that the modified node is truncated, and traversing the at least one modified syntax tree to generate a second code that is shorter than at least one identified code. The method also includes providing the generated second code, the at least one modified syntax tree, and the code generation task as input to a language model to generate output code.

20 Claims, 7 Drawing Sheets

(56) References Cited

U.S. PATENT DOCUMENTS

| 2025/0362885 | A1* | 11/2025 | Peng | .......................... | G06F 8/30 |
| 2026/0037234 | A1* | 2/2026 | Kumar | ...................... | G06F 8/35 |
| 2026/0044319 | A1* | 2/2026 | Zhang | ...................... | G06F 8/35 |

* cited by examiner

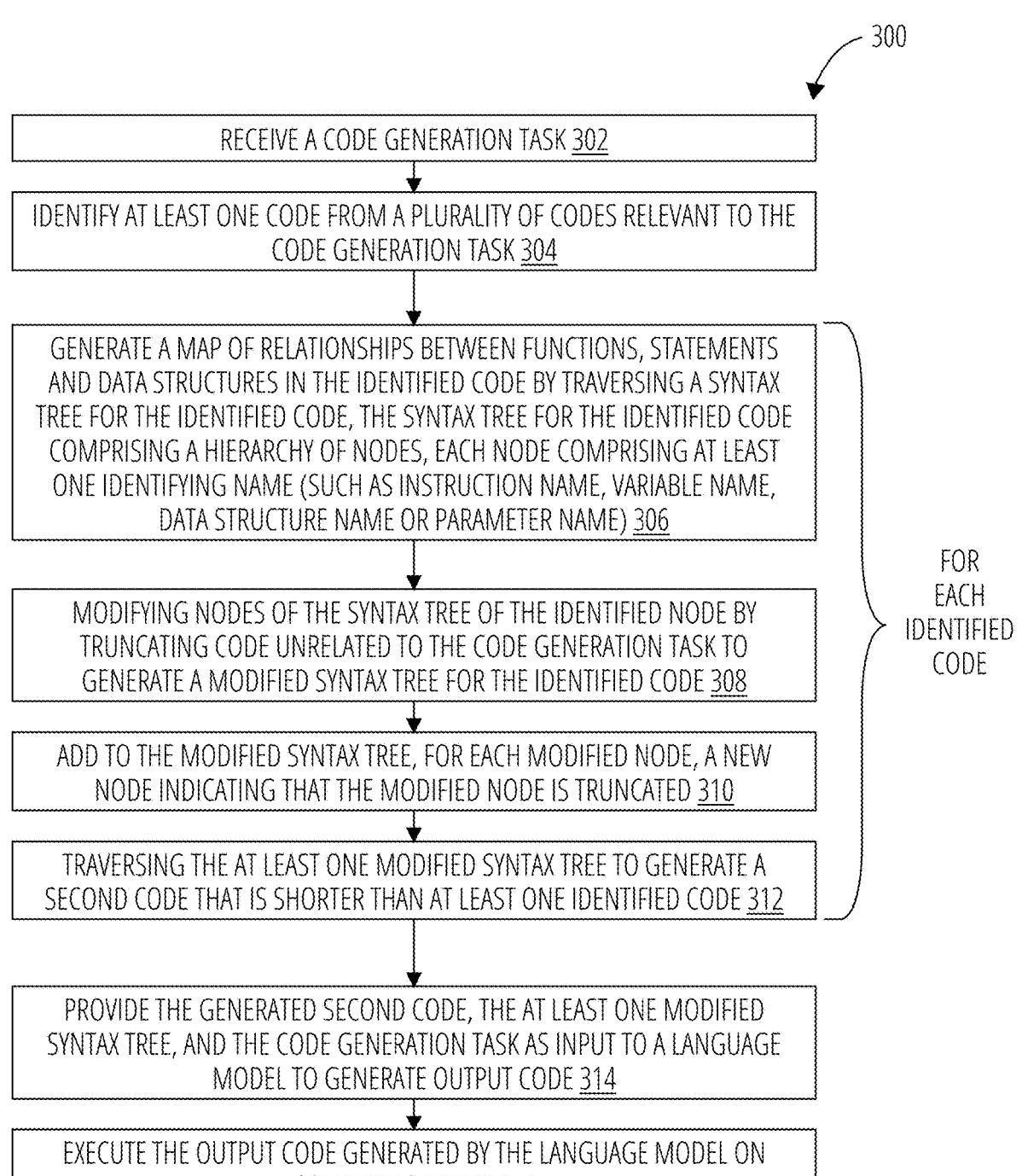

RECEIVE A CODE GENERATION TASK 302

IDENTIFY AT LEAST ONE CODE FROM A PLURALITY OF CODES RELEVANT TO THE CODE GENERATION TASK 304

GENERATE A MAP OF RELATIONSHIPS BETWEEN FUNCTIONS, STATEMENTS AND DATA STRUCTURES IN THE IDENTIFIED CODE BY TRAVERSING A SYNTAX TREE FOR THE IDENTIFIED CODE, THE SYNTAX TREE FOR THE IDENTIFIED CODE COMPRISING A HIERARCHY OF NODES, EACH NODE COMPRISING AT LEAST ONE IDENTIFYING NAME (SUCH AS INSTRUCTION NAME, VARIABLE NAME, DATA STRUCTURE NAME OR PARAMETER NAME) 306

MODIFYING NODES OF THE SYNTAX TREE OF THE IDENTIFIED NODE BY TRUNCATING CODE UNRELATED TO THE CODE GENERATION TASK TO GENERATE A MODIFIED SYNTAX TREE FOR THE IDENTIFIED CODE 308

ADD TO THE MODIFIED SYNTAX TREE, FOR EACH MODIFIED NODE, A NEW NODE INDICATING THAT THE MODIFIED NODE IS TRUNCATED 310

TRAVERSING THE AT LEAST ONE MODIFIED SYNTAX TREE TO GENERATE A SECOND CODE THAT IS SHORTER THAN AT LEAST ONE IDENTIFIED CODE 312

FOR EACH IDENTIFIED CODE

PROVIDE THE GENERATED SECOND CODE, THE AT LEAST ONE MODIFIED SYNTAX TREE, AND THE CODE GENERATION TASK AS INPUT TO A LANGUAGE MODEL TO GENERATE OUTPUT CODE 314

EXECUTE THE OUTPUT CODE GENERATED BY THE LANGUAGE MODEL ON COMPUTING DEVICE 316

402
DATA COLLECTION AND PREPROCESSING

404
FEATURE ENGINEERING

406
MODEL SELECTION AND TRAINING

408
MODEL EVALUATION

410
PREDICTION

412
VALIDATION, REFINEMENT OR RETRAINING

414
DEPLOYMENT

CONTEXT-AWARE CODE GENERATION USING SYNTAX TREE MODIFICATION AND LEVEL-OF-DETAIL PROCESSING

CROSS REFERENCE TO RELATED APPLICATIONS

This application is a continuation of U.S. patent application Ser. No. 19/320,770, filed Sep. 5, 2025, which application claims priority to and incorporates by reference U.S. Provisional Patent Application No. 63/811,276 filed May 23, 2025, which applications and publications are incorporated herein by reference in their entirety.

TECHNICAL FIELD

The disclosure relates to large language models and more specifically, but not exclusively, to generating code using large language models.

BACKGROUND

The field of automated code generation using artificial intelligence has experienced rapid growth, particularly with the advent of large language models (LLMs) capable of understanding and generating source code. However, existing approaches face significant limitations in providing appropriate context to these models for effective code generation.

A fundamental challenge in LLM-based code generation is the context window limitation. Even modern LLMs with large context windows (e.g., 1 million tokens) can become confused when presented with entire codebases, and the inclusion of third-party dependencies further complicates the context management problem. Simply dumping whole codebases into an LLM is not feasible due to both technical limitations and the degradation of output quality that occurs when models are overwhelmed with irrelevant information.

SUMMARY

A method begins by receiving a code generation task and identifying relevant code from a plurality of available codes through search mechanisms that may include keyword-based search, semantic search, or LLM-assisted classification. For each identified code, the system generates a syntax tree-a hierarchical representation where each node contains identifying names such as instruction names, variable names, data structure names, or parameter names—and creates a comprehensive map of relationships between functions, statements, and data structures by traversing these syntax trees. The system then modifies the syntax tree nodes by truncating code that is unrelated to the specific code generation task, using factors such as the number of "hops" or steps between code elements, the structural proximity of functions and data types, and the relevance of external dependencies to the immediate task. The system adds new nodes to the modified syntax tree that explicitly indicate where truncation has occurred, providing transparency that allows the LLM to understand that certain code sections have been simplified or removed, preventing the model from making incorrect assumptions about missing functionality. The system then traverses the modified syntax trees to generate compressed code that is shorter than the original identified code while retaining essential context, and this compressed code, along with the modified syntax trees and the original code generation task, is provided as input to the language model as context to generate output code that can be executed on a computing device.

BRIEF DESCRIPTION OF THE DRAWINGS

The present systems and methods are described in detail below with reference to the attached drawing figures. To easily identify the discussion of any particular element or act, the most significant digit or digits in a reference number refer to the figure number in which that element is first introduced. In the drawing figures:

FIG. 3 is a flowchart illustrating a method, according to various examples of the present disclosure.

DETAILED DESCRIPTION

Figure 1:
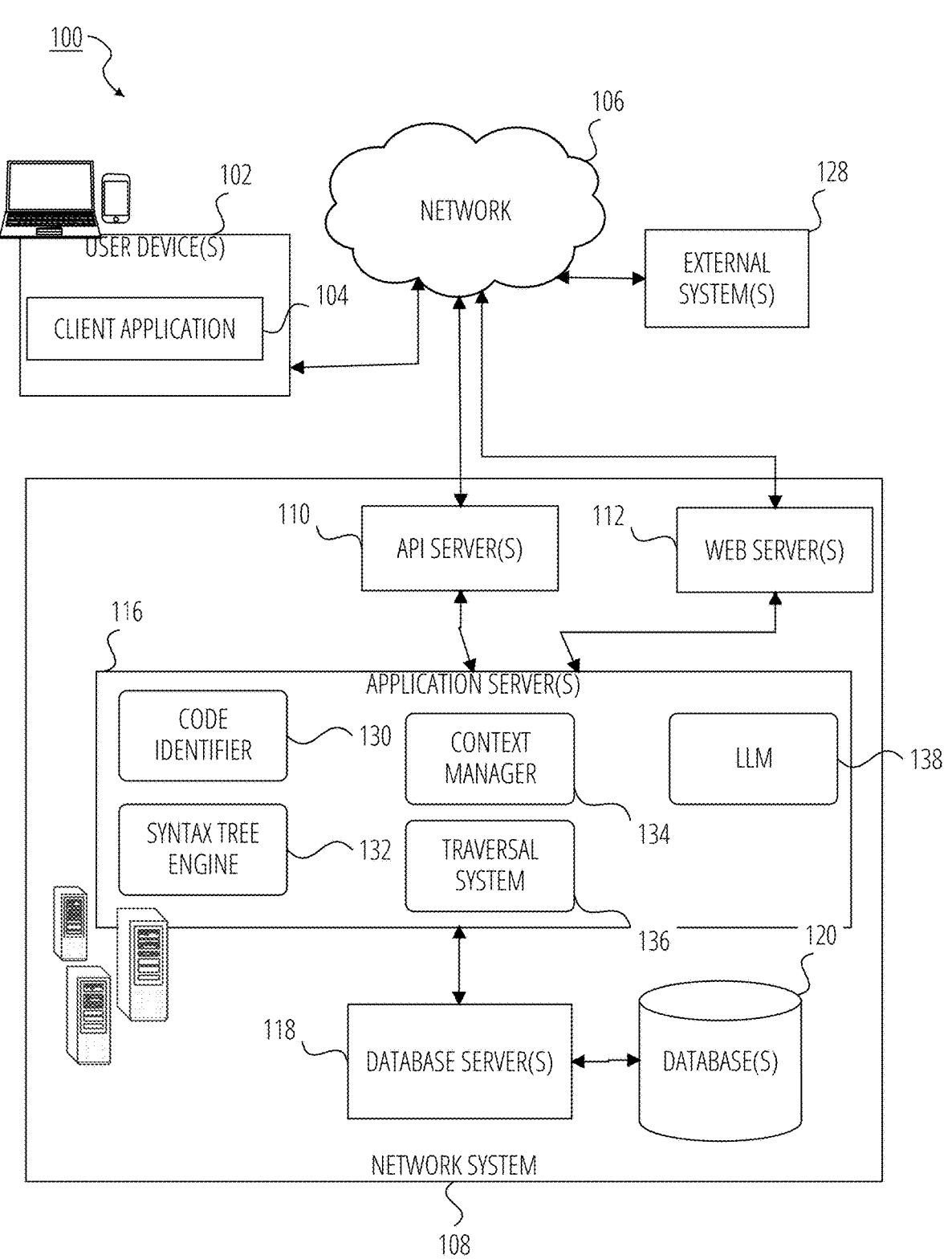
FIG. 1 is a block diagram showing an example network environment that includes a code generation system, according to various examples of the present disclosure.

The description that follows includes systems, methods, techniques, instruction sequences, and computing machine program products that embody illustrative embodiments of the present disclosure. In the following description, for purposes of explanation, numerous specific details are set forth in order to provide a thorough understanding of embodiments. It will be evident, however, to one skilled in the art that the present inventive subject matter may be practiced without these specific details. Furthermore, well-known features may be omitted or simplified in order not to obscure the described embodiments.

The disclosure provides a system that operates through several components working in sequence. The system begins by finding relevant source code through search and classification mechanisms, then applies level-of-detail processing to adjust code complexity presented to the LLM. The system manages context through dynamic conversation history rebuilding, validates generated output through compilation and testing, reviews code quality through automated processes, and performs post-processing to restore production-ready functionality.

The system parses source code files into hierarchical syntax trees, which provide structured representations of the textual source code content. These syntax trees describe relationships between code elements, such as how classes contain functions, which in turn have parameters and implementations. The system uses these relationships to build a traversable graph through the codebase.

The level-of-detail functionality allows dynamic adjustment of code complexity presented to the LLM. The system can selectively remove function bodies while preserving signatures, simplify complex data structures, and insert explanatory text where code has been truncated. When modifying syntax trees, the system removes nodes that are not essential for the current task while keeping reference nodes and surrounding structural elements.

The context management component rebuilds conversation history 220 rather than accumulating previous attempts. When compilation errors occur, the system reconstructs the context from scratch, providing only the most recent version of each relevant source code file. The system applies the same syntax tree analysis to error messages, following the graph to identify and include relevant code sections for error correction.

The validation framework provides error detection through compilation checking, code review processes, and integration testing. The system employs multiple validation steps including syntax error checking, code review validation, compilation attempts, and runtime testing.

The system supports multiple LLM pipelines for different tasks, such as user interface generation and backend code development. The system processes various types of structured content beyond source code, including HTML markup for user interfaces.

Post-processing capabilities transform simplified code representations back into production-ready implementations. This includes restoring multilingual support by replacing hardcoded text with translation lookup functions and performing automatic code refactoring through syntax tree manipulation.

The system extends to other structured document types that can be represented as traversable trees, including computer aided design (CAD) drawings, legal documents, and technical specifications. The system applies the same syntax tree analysis and level-of-detail processing techniques to these alternative document types. Once the system completes its tasks, the generated code can be run or device or product (e.g., automobile, engine, etc.) built in the case of CAD drawings.

FIG. 1 is a block diagram showing an example network environment 100 that includes a code identifier 130, syntax tree engine 132, context manager 134, traversal system 136 and a LLM 138 according to various examples of the present disclosure. As shown, the network environment 100 includes one or more user devices 102, a network system 108, and a network 106 (e.g., Internet, wide-area-network (WAN), local-area-network (LAN), wireless network) that communicatively couples them together. Each user device 102 can host a number of applications, including a client software application 104. The client software application 104 can communicate and exchange data with the network system 108 via a network 106.

A user device 102 may comprise but is not limited to, a smartphone, tablet, laptop, multi-processor systems, microprocessor-based or programmable consumer electronics, game consoles, or any other communication device that can access the network system 108. Additionally, each user device 102 comprises a display component (not shown) to display information (e.g., in the form of user interfaces) as will be discussed in more detail below.

The network system 108 provides server-side functionality via the network 106 to the client software application 104. While certain functionality is described herein as being performed by the code identifier 130, syntax tree engine 132, context manager 134, traversal system 136 and a LLM 138 on the network system 108, it will be appreciated that the location of certain functionality within the network system 108 is a design choice. For example, it may be technically preferable to initially deploy certain technology and functionality within the network system 108, but to later migrate this technology and functionality to the client software application 104.

The network system 108 supports various services and operations that are provided to the client software application 104 by the code identifier 130, syntax tree engine 132, context manager 134, traversal system 136 and a LLM 138. Further details regarding the various services and operations provided by the code identifier 130, syntax tree engine 132, context manager 134, traversal system 136 and a LLM 138 are discussed below, but generally, these operations include: transmitting data from any one or more of the code identifier 130, syntax tree engine 132, context manager 134, traversal system 136 and a LLM 138 to the client software application 104; receiving data from the client software application 104 at any one or more of the code identifier 130, syntax tree engine 132, context manager 134, traversal system 136 and a LLM 138; and processing data generated by the client software application 104. Data exchanges within the network environment 100 may be invoked and controlled through operations of software component environments available via one or more endpoints, or functions available via one or more user interfaces of the client software application 104, which may include web-based user interfaces provided by the server system 108 for presentation at the user device 102.

With respect to the network system 108, one or more application programing interface (API) servers 110 and one or more web servers 112 are coupled to and provide programmatic and web interfaces respectively to one or more application servers 116. The application server(s) 116 host various systems including the code identifier 130, syntax tree engine 132, context manager 134, traversal system 136 and a LLM 138, each of which comprises a plurality of components and each of which can be embodied as hardware, software, firmware, or any combination thereof. The application server(s) 116 are, in turn, coupled to one or more database servers 118 that facilitate access to one or more databases 120. The database(s) 120 may be stored in one or more storage devices and may, for example, include code that the code identifier 130 identifies as relevant to a programming task.

The API server(s) 110 receives and transmits data (e.g., API calls, commands, requests, responses, and authentication data) between the user device(s) 102 and the application server 116. Specifically, the API server(s) 110 provides a set of interfaces (e.g., routines and protocols) that can be called or queried by the client software application 104 in order to invoke the functionality of the application server(s) 116. The API server(s) 110 expose various functions supported by the application server 116 including, without limitation, messaging, listing publication, and review of goods and services and sellers thereof.

The code identifier 130 is responsible for locating and selecting relevant source code files from the codebase, e.g., in the database(s) 120, that are pertinent to the current code generation task. This code identifier 130 implements the search functionality described in the system, which can operate through multiple approaches including keyword-based search, semantic search, and LLM-assisted classification. The code identifier 130 analyzes user specifications and high-level task descriptions to determine which source code files should be processed.

The syntax tree engine 132 parses source code files into hierarchical syntax trees, which provide structured representations of the textual source code content. The syntax tree engine 132 performs the parsing operation that converts source code text into tree structures where each node represents code elements such as functions, classes, variables, and their relationships. The syntax tree engine 132 creates the foundational data structure that enables all subsequent analysis and manipulation operations within the system.

The context manager 134 orchestrates the overall context preparation process and implements the level-of-detail functionality. The context manager 134 modifies syntax trees by selectively removing or simplifying nodes that are not essential for the current task while preserving reference nodes and surrounding structural elements. The context manager 134 also handles the dynamic rebuilding of conversation history 220, ensuring that previous failed attempts do not accumulate in the LLM context. Additionally, it manages the integration of error feedback and validation results into subsequent context preparation cycles.

The traversal system 136 navigates through the syntax trees and follows relationships between code elements to map or build a graph of dependencies. This component implements the graph traversal algorithms that identify which code sections are related to the current task by following references between functions, data structures, and other code elements. The traversal system determines the appropriate level of detail for each code section based on its distance from the primary area of interest and applies the compression mechanisms that remove irrelevant details.

The LLM 138 receives the processed and contextualized source code from the other components and generates new or modified code based on the provided context and task specifications. The LLM 138 processes the prepared input content that has been reduced in size and simplified by the preceding components. The LLM 138 produces output code that is then fed back into the validation and review processes managed by the other system components.

The environment 100 can also comprise one or more external systems 128. The external system(s) 128 can be a third-party system that performs data operations or processing for the network system 108. For example, the external system(s) 128 can comprise a large language model (LLM) or generative artificial intelligence (AI) system that processes data on behalf of the network system 108. The LLM is a trained model configured to generate text and perform natural language processing tasks such as classifying an intent of messages.

Any of the systems, data storage, or devices (collectively referred to as "components") shown in, or associated with, FIG. 1 may be, include, or otherwise be implemented in a special-purpose (e.g., specialized or otherwise non-generic) computer that can be modified (e.g., configured or programmed by software, such as one or more software components of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined, and the functions described herein for any single component may be subdivided among multiple components. Functionalities of one system may, in alternative examples, be embodied in a different system. While only a single 108 is shown, alternatively, more than one network system 108 can be included (e.g., localized to a particular region).

Figure 2:
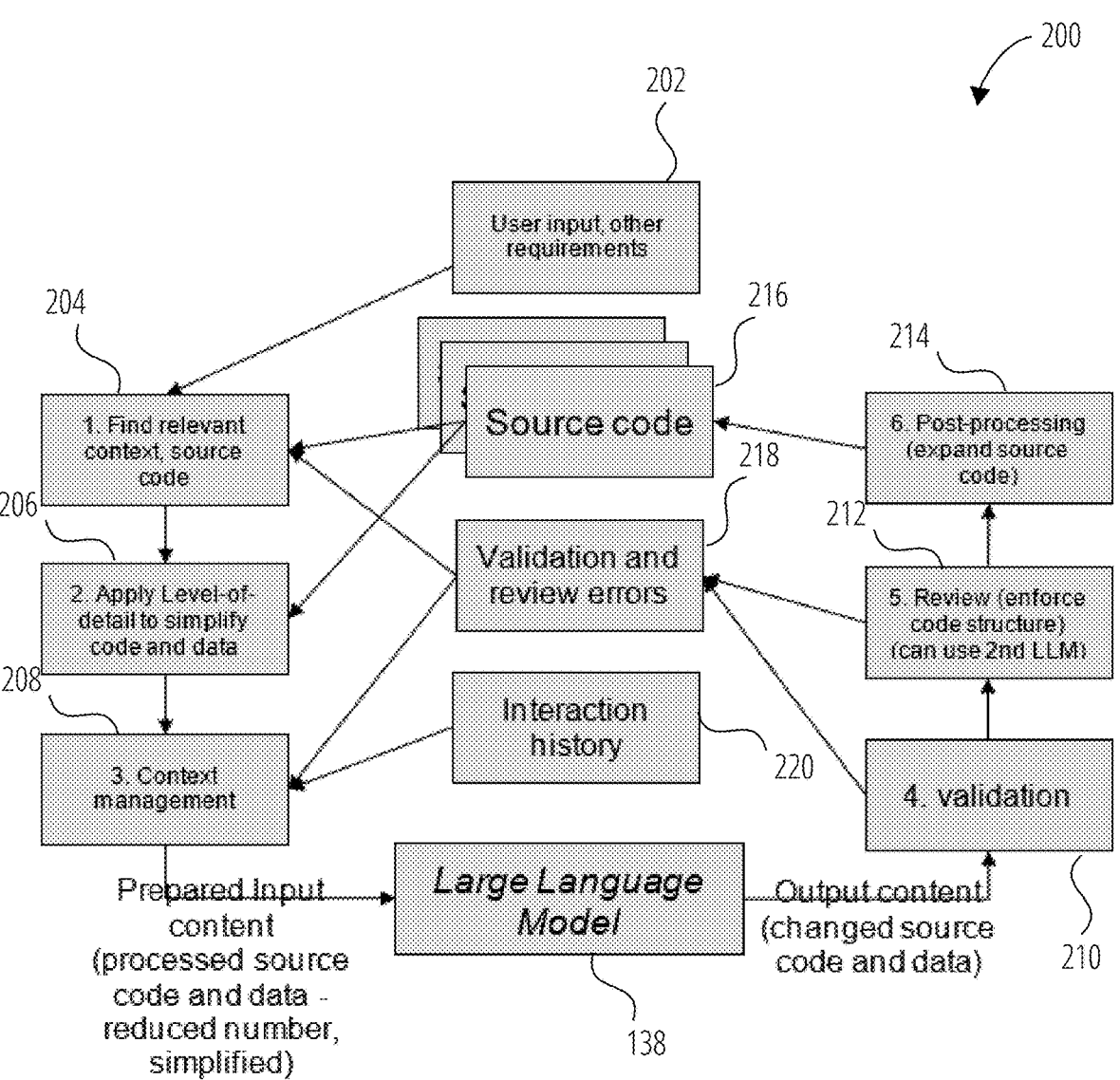
FIG. 2 is a block diagram illustrating a management layer, according to various examples of the present disclosure.

FIG. 2 is a block diagram illustrating a management layer 200, according to various examples of the present disclosure. The management layer 200 may include the code identifier 130, the syntax tree engine 132, the context manager 134 and the traversal system 136. Once relevant source code is identified at block 204 based on user input at block 202, the source code is adjusted by apply level of detail functionality at block 206. The management layer 200 adds a "level-of-detail" functionality that exposes code and code-fragments that the LLM 138 will need and allow "turning a nob" to increase or decrease details as needed. This is based on fully understanding the code that the LLM 138 is modifying: syntactically and semantically break it down into what it is about and how it is referencing other files. The management layer 200:

Finds these references and then "simplifies" them→e.g. if it's a function, return the full definition but completely remove the body or just leave a few important pieces in it.

Do the same for class methods or interfaces-simplify them by removing everything that was not referenced by the code of the file the LLM 138 is modifying "Clearly mark" the parts that have been simplified or removed.

Allow the LLM 138 to ask for these parts that are missing so it can "see" the full versions if needed.

1. Similar to a code-compiler, the management layer 200 parses all source code 216 files and turns them into a syntax-tree. A syntax tree is a hierarchical representation of the textual source code content. 2. The syntax tree describes e.g. how a "class" has "functions" which in turn have "parameters" and an "implementation". A function implementation will call out to other functions and also defines variables of specific types. 3. Calling functions and defining variables and parameters of specific types means that the code has "references" to other parts of the source code 216 in the same or different files. The management layer uses this to build a "graph" through the code-base that can be followed 4. In the next step, the management layer 200 produces the prompt context for the LLM 138. First, at block 204, it identifies the source code 216 files that need to be modified. It traverses the syntax trees for these files. Whenever it finds symbols in the tree that look like references to other files it uses the graph built in step 3 and follows the graph to these other syntax trees.

This step allows the management layer 200 to build up a graph of the source code 216. It also supports the inclusion of "3rd party" dependencies, i.e. code that is not part of the code base but code that is required to build and run it. Oftentimes, these 3rd party dependencies are not included in the "prompt context" due to the complexity of deciding what to use and what not. This is often OK since most LLMs know some of the 3rd party dependencies. But they might possibly only know an outdated version, which then causes issues in the produced code. The management layer 200 avoids that by also including some or all of the references that point into 3rd party code and following them further. The decision which to follow can be done statically (e.g. naming which ones to follow) or even based on criteria such as release dates of 3rd party dependencies used and comparing them with the "knowledge cutoff" date of the LLM used 5. The amount of steps to take through the graph and to follow references is a parameter that can be fixed or dynamically decided based on the current situation. The more steps to take means more source code 216 is considered which is a tradeoff between adding more information and not overloading the prompt context. One of the criteria might be the available "prompt context" size of the LLM, desired processing speed, quality or cost (larger context takes longer to process, costs more but produces better results).

6. For every reference that is encountered, the management layer 200 marks that position in the appropriate syntax tree. This is done for example by remembering the associated tree node or the location in the source code 216

7. When done traversing the syntax trees, there's a set of syntax tree nodes that define all the references in the source code 216 that might be needed to communicate to the LLM.

8. In the next step the management layer 200 will produce source code "snippets" that will be used as content for the prompt context. These snippets are supposed to look like simplified versions of a source code 216 file that contains only the parts that are important for the "references". This is achieved by modifying the syntax tree in a way that keeps only the reference nodes and the nodes surrounding it. For example, a node might contain a "function name" and the parent node in the syntax tree marks this as a "function definition". In this case both nodes are kept-which means these two help define a simplified version of a function. Similarly, nodes for "function parameter" definitions might be kept since they contain important information for an LLM when implementing code. On the other hand, parts that are not important are removed. For example the "function body" might not be needed since the LLM does not need to know how a function is doing its work, the input and output might suffice. The exact decision of what nodes to keep and which ones to remove can be specific to the situation and is one of the parameters that are tuned by the invention to "increase" or "decrease" the level of detail provided to an LLM.

9. For some nodes that were removed from the tree in step 8 the management layer 200 inserts new nodes that basically contain explanations about the reasons for the "removal".

10. When all the syntax tree modification is done, at block 206 they are turned back into source code files by traversing the trees and nodes and writing the source code that is represented by them. For the removed nodes with tags from the previous step the management layer adds instructions to the LLM that could simply say "truncated code" or tell the LLM that it can ask for more details about this code if needed. This allows the LLM to understand that this is not "all" the code so it shouldn't try to solely rely on it.

11. In addition to just keeping and removing nodes, the management layer is also using a "simplification" step in some cases. It's rewriting the remaining source code to exclude some details that make it harder for the LLM to produce proper source code. One example of that simplification step is that user interface source code often uses the ability to present the user interface in multiple display languages. Which requires the source code not to include actual human-readable text but instead "translation lookup keys" that reference a table with texts in each language.

Since this concept might make it harder for an LLM to understand or produce the correct code, the invention might replace the translation keys in user interface code with e.g. the "english" version of the texts and then shows this version of the source code to the LLM so it doesn't have to know about translations.

12. Yet another step that the management layers 200 may employ is "translating" source code from one code language to another. For example, if an LLM is tasked with creating source code in one language but it also needs to consider SQL database code to understand the data storage, then this requires the LLM to look at secondary source code language that it might be less familiar with. In order to avoid the language switch, the management layer will create a syntax tree of the source language, e.g. in SQL and then finds a representation of the syntax tree in another language that most closely matches it. For example, the table structure definition from SQL might be turned into a class or interface definition of a compiled language.

At block 204, the management layer 200 will find relevant context and also find potentially relevant code by using a user "specification" of what is to be built. E.g. if a screen layout is to be built, use the user provided description and then match this with a library of UI components to find the ones that might be useful. For all identified components, run them through the same level of details steps as above to minimize the context size Technical Steps:

Using the level of detail functionality above, create abridged versions of files in the database(s) 120.

Determine what the next "high-level" task for the LLM 138 should be, e.g. implement a new user facing feature.

Add this high-level task to a "prompt context" together with the abridged source code files and have the LLM 138 classify which of the provided documents seem relevant for the implementation of that new feature Use the source code files identified in the previous step and increase their level-of-detail to a degree that is useful for the actual implementation step.

Then add these source code files to the next prompt context together with other relevant documents and invoke an LLM for the code implementation.

Context management and validation at blocks 208 and 210.

When code is produced, the management layer 200 runs compilation and validation against it. If it fails, do another roundtrip with the LLM 138. BUT: in comparison to usual coding tools, don't just add to an ongoing "chat" with the LLM 138. If there's a bug in the code and the LLM 138 makes another attempt at it that has other issues, now the LLM 138 has 2 examples of broken code and it gets more likely that the LLM 138 takes these broken examples as "multi-shot" examples, hence, is more likely to produce more of the broken code.

Instead, the management layer 200 rebuilds the chat history 220 and purges old examples: keep an outline of what was discussed or completely remove pieces that were problematic. The management layer 200 also expands any error messages during compilation with similar code-insight as above: find all references to code that are mentioned in the errors 218, pull these out and give them to the LLM 138 as additional context. Often times compiler errors 218 are caused by the LLM 138 not fully understanding the code and it hallucinates function names etc. By collecting all the files that are related to the error 218 and the files it touches, the management layer 200 gives the LLM 138 this content.

The management layer 200 can also change the detail of the syntax/context crawler to get a better picture for the next try Technical Steps:

1. In order to have the LLM 138 produce new source code or modify existing, the management layer 200 adds all relevant source code into the prompt context as previously outlined and the invokes the LLM 138.

2. When the LLM 138 is done, it will return source code files with the changes 3. In order to determine if the changes are valid, the invention employs a number of validation steps a. Check for basic syntax errors to ensure each source code file is usable. In order to do so, use the parsing steps as previously explained b. Optionally run code-review checks to ensure the code passes expected quality measures. This step uses the syntax tree created in the previous step. See more details in the next section c. Integrate the changed files into the code base and use a compiler or similar tool and attempt to produce an output program d. Run additional steps as needed such as code-tests or run-time tests 4. Each of the steps above might produce errors 218 that will reject the produced source code and require more round-trips with the LLM 138 to make the source code passable. In order to do so, a common practice is to repeat the complete previously used "prompt context" and then also attach the source code made by the LLM 138 in the previous step together with the errors 218 encountered, then invoke the LLM 138 once more. A challenge of this approach is that if the LLM 138 makes another mistake in the next round and the pattern is repeated, the "prompt context" will be ever increasing and eventually gets very large. In addition, the "prompt context" will actually contain multiple versions of the same source code files in different iterations that might all have different code issues (one for each iteration). Since LLMs are very good at recognizing and repeating patterns in their responses, the likelihood of the LLM 138 to produce similarly broken code will get higher with more iterations and in addition due to the increased "prompt context" size it might not pay attention anymore to the most essential details of the problem to solve.

5. In order to avoid the challenges outlined above, the management layer uses a different approach that keeps the size of the "prompt context" relatively unchanged during the iterations. Instead of "adding" to the "prompt context", the management layer 200 "rebuilds" the context from scratch during each iteration, essentially keeping only the most recent version of each source code file that is relevant. In order to do so, the management layer 200 keeps track of all the essential documents for the task and then finds other relevant documents for only the current iteration using the level-of-detail and document search processes outlined in previous sections. That means across repeats, the LLM 138 might see very different sets of source code files and only the main source code files might be repeatedly shown.

In addition, the management layer 200 will apply the level-of-detail and search for relevant context using the error messages it received. For example, if the compilation validation step results in an error errors 218 that points to a place in a source file, the management layer will search the syntax tree in the neighborhood of where the error 218 occurred and then follow the graph to other source files to pull in relevant information to help fix the error 218. Since this process can go several steps far, a lot of contextual information can be included that give a lot of details on why an error happened and how it can be fixed.

In order to ensure the code produced by an LLM adheres to a given standard, the management layer uses the following steps for an automatic code review process at block 212. Technical Steps:

1. Use syntax tree for code-review.

2. Since each syntax tree node carries specific meaning, the management layer can enforce requirements for certain kinds of nodes. For example, if it encounters nodes that represent a "function name" or "variable name", it can make sure their naming fulfills a required pattern. This can be done using simple algorithms or also by using AI to understand the meaning of the names.

3. In addition, any kind of code structure convention is reflected in a syntax tree of a specific shape. The management layer uses tree traversal and pattern recognition to identify if this expected code structure is present.

4. The pattern recognition can be implemented in different ways a. Use algorithms or heuristics to scan the tree for specific nodes, e.g. expect a certain sequence of nodes to be present/absent in the code. For example, a structure that might be enforced is that some files that are creating a user interface structure will not contain business logic. This is done by making sure that the presence of specific tree nodes that represent user interface code will exclude the presence of tree nodes that represent "function definitions"

b. Use an LLM to write algorithms explained above. In this case users can provide high-level documentation of what they expect to see/not see in the source code. The invention will use instructions to ask the LLM to build algorithms that in turn traverse and checking the syntax trees and enforce a specific tree structure c. Use an LLM/AI that is specifically designed for understanding syntax trees and can be instructed to enforce desired structure.

Source code post processing at block 214 can include the following technical steps.

Once valid source code is produced, additional postprocessing might be applied:

Add multi-lingual support: This step is a reversal of the previously described removal of translation keys in user interfaces. Using the syntax tree, the management layer is able to tell which elements of the source code produced by the LLM are used for building user interfaces and which are user-facing text strings. It might replace these text strings with new syntax tree nodes that use a typical translation-lookup function instead. Then it moves the actual texts received from the LLM and inserts them into the language translation tables, making sure the translation-lookup function in the original user interface location references them. In addition, the texts inserted into the translation tables might then be translated into other languages using an LLM 138

Code refactoring: Some of the results of the source code review step might be "automatically" fixable. I.e. instead of presenting validation errors to an LLM 138 for fixing, the management layer can modify the syntax trees to reshape the source code as desired. One example of this is the automatic enforcement of separating user interface code from business logic code. If the review finds violations of this, the invention might automatically detect all nodes in a source code file that belong to either the user interface or the business logic functions and then moves the nodes for one of the two into another source code file that is meant to contain them.

The management layer 200 can use the same approach for other types of "highly structured" documents that can be turned into a "tree" of content that can be traversed and has references to content in other documents and possibly can be "validated" to check that new LLM content is "correct". This includes CAD drawings with multiple layers that also span multiple "files" (i.e. reference 3D objects in other files and the "correctness" of the 3D structures can be validated using algorithms that check the mesh structure and adherence to desired physical properties) or highly structured legal/specification/regulatory documents or markup with references to sections in others. For some types of documents, the level of detail might not just include the decision of what nodes to keep and which ones to remove. It can also "combine" multiple nodes into a single node, e.g. by "simplifying" or "summarizing" the content of the previous nodes. For example, in the case of CAD documents, this might mean creating a "simplified" version of a 3D object using vertice reduction/collapsing techniques that remove as many details as desired before presenting them to a LLM. In specification/regulatory documents, the nodes might be summarized using an LLM to create a more compact representation.

Other coding tools use a combination of RAG and grep of their codebases to find the correct context. An extension of what is outlined above can be used in combination with the existing context generation methodologies.

AI software engineer. Using the context insight tool will give system the ability to let an LLM understand almost any codebase, leading the system to be able to build a fully autonomous AI software engineer that can understand the codebase, find the relevant context for changes, and then apply those changes. A human can then review their work in a typical github pull request workflow. In addition, parts of the techniques outlined can be used for work produced by humans. For example the source code review and post-processing flows can be applied in lieu or addition to existing code-review processes to automate the work.

FIG. 3 is a flowchart illustrating a method 300, according to various examples of the present disclosure. The process begins at block 302 where the management layer 200 receives a code generation task, which serves as the input specification for what needs to be accomplished. This initial task specification is processed by the code identifier 130 within the management layer 200, which is responsible for locating and selecting relevant source code files from the codebase, stored in the database(s) 120, that are pertinent to the current code generation task.

At block 304, the code identifier 130 of the management layer 200 identifies at least one code from a plurality of codes relevant to the code generation task. The code identifier 130 implements the search functionality which can operate through multiple approaches including keyword-based search, semantic search, and LLM-assisted classification, analyzing user specifications and high-level task descriptions to determine which source code files should be processed.

The following steps are performed iteratively for each piece of identified code, and shows where the syntax tree engine 132 and traversal system 136 within the management layer 200 work together to generate a map of relationships between functions, statements and data structures in the identified code by traversing a syntax tree for the identified code. The syntax tree engine 132 parses the source code files into hierarchical syntax trees, performing the parsing operation that converts source code text into tree structures where each node represents code elements such as functions, classes, variables, and their relationships. The syntax tree for the identified code comprises a hierarchy of nodes, each node comprising at least one identifying name such as instruction name, variable name, data structure name or parameter name. The traversal system 136 navigates through these syntax trees and follows relationships between code elements to map or build the graph of dependencies, implementing graph traversal algorithms that identify which code sections are related to the current task.

At block 308, the management layer 200 modifies nodes of the syntax tree of the identified code by truncating code unrelated to the code generation task to generate a modified syntax tree for the identified code. The context manager 134 orchestrates the overall context preparation process and implements the level-of-detail functionality, selectively removing or simplifying nodes that are not essential for the current task while preserving reference nodes and surrounding structural elements. The traversal system 136 supports this process by determining the appropriate level of detail for each code section based on its distance from the primary area of interest and applying the compression mechanisms that remove irrelevant details.

At block 310, the context manager 134 of the management layer 200 adds to the modified syntax tree, for each modified node, a new node indicating that the modified node is truncated. This provides explanatory information about what has been removed from the original code, ensuring the LLM understands that the presented code is not complete. At block 312, the traversal system 136 within the management layer 200 traverses the at least one modified syntax tree to generate a second code that is shorter than the at least one identified code. The traversal system produces the compressed version of the source code for LLM consumption through its graph traversal algorithms.

At block 314, the context manager 134 of the management layer 200 provides the generated second code, the at least one modified syntax tree, and the code generation task as input to the LLM 138 to generate output code. The LLM 138 receives the processed and contextualized source code from the other components within the management layer 200 that has been reduced in size and simplified by the preceding components, then generates new or modified code based on the provided context and task specifications. Finally, at block 316, the management layer 200 executes the output code generated by the language model on a computing device, representing the validation and testing phase where the output code produced by the LLM 138 is fed back into the validation and review processes managed by the other system components within the management layer 200.

Machine-Learning Pipeline 500

Figure 5:
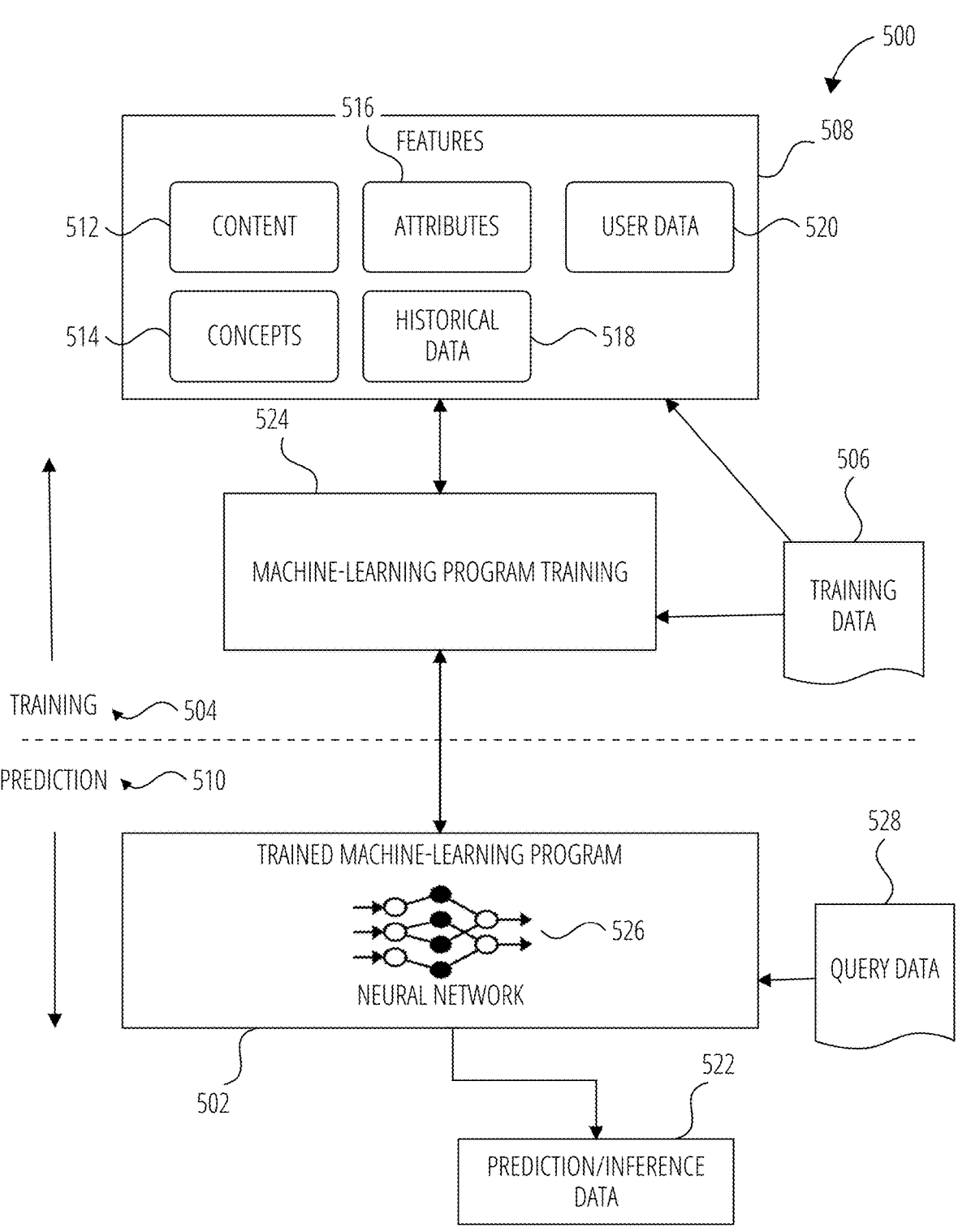
FIG. 5 is a block diagram illustrating training and use of a machine-learning program, according to some examples.

FIG. 5 is a flowchart depicting a machine-learning pipeline 500, according to some examples. The machine-learning pipeline 500 may be used to generate a trained model, for example the trained machine-learning program 502 of FIG. 5, to perform operations associated with searches and query responses.

Overview

Broadly, machine learning may involve using computer algorithms to automatically learn patterns and relationships in data, potentially without the need for explicit programming. Machine learning algorithms can be divided into three main categories: supervised learning, unsupervised learning, and reinforcement learning.

Supervised learning involves training a model using labeled data to predict an output for new, unseen inputs.

Examples of supervised learning algorithms include linear regression, decision trees, and neural networks.

Unsupervised learning involves training a model on unlabeled data to find hidden patterns and relationships in the data. Examples of unsupervised learning algorithms include clustering, principal component analysis, and generative models like autoencoders.

Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks, which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

Training Phases 504

Figure 4:
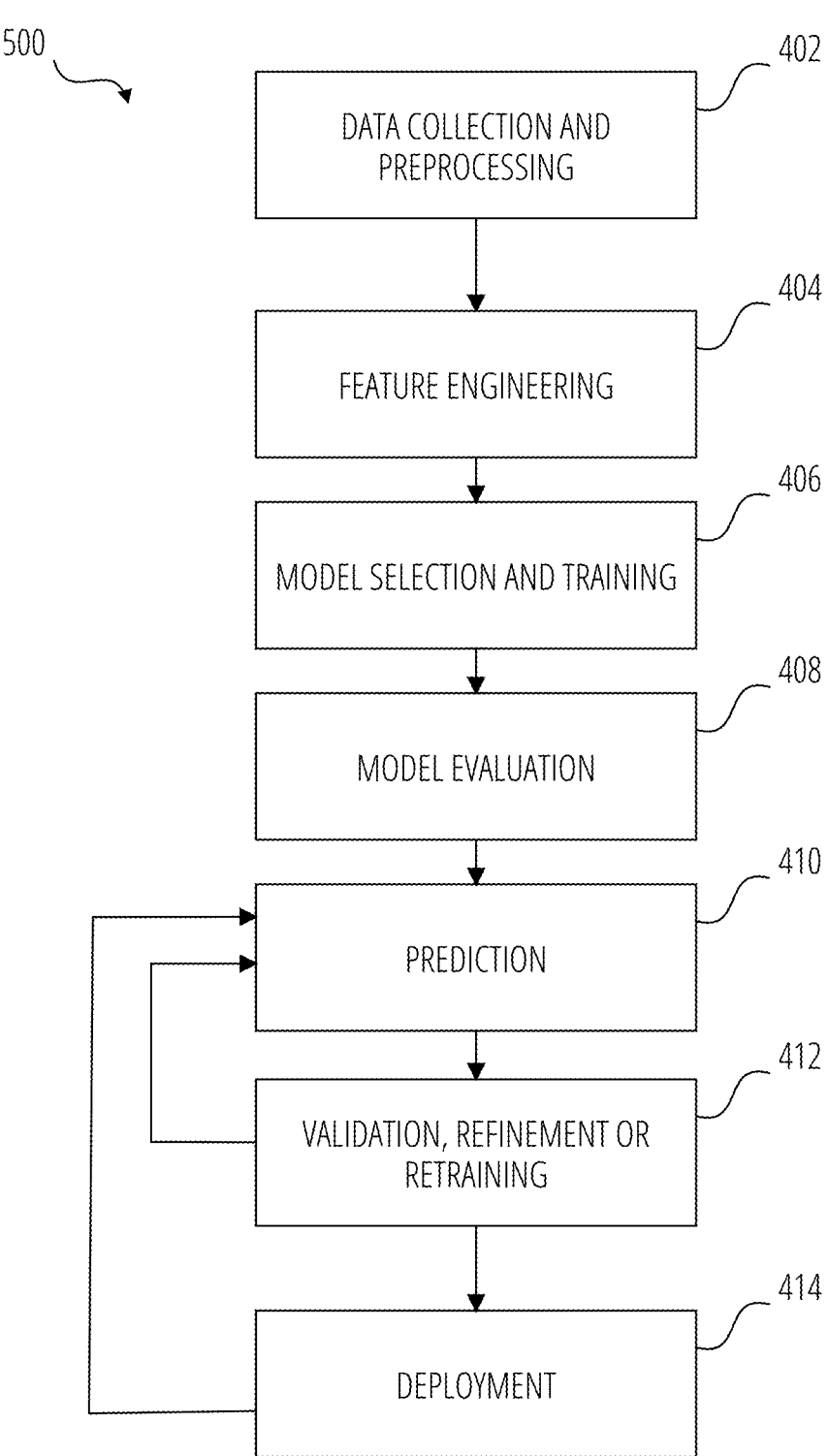
FIG. 4 is a block diagram illustrating machine-learning pipeline, according to some examples.

Generating a trained machine-learning program 502 may include multiple phases that form part of the machine-learning pipeline 500, including for example the following phases illustrated in FIG. 4:

Data collection and preprocessing 402: This phase may include acquiring and cleaning data to ensure that it is suitable for use in the machine learning model. This phase may also include removing duplicates, handling missing values, and converting data into a suitable format.

Feature engineering 404: This phase may include selecting and transforming the training data 506 to create features that are useful for predicting the target variable. Feature engineering may include (1) receiving features 508 (e.g., as structured or labeled data in supervised learning) and/or (2) identifying features 508 (e.g., unstructured or unlabeled data for unsupervised learning) in training data 506.

Model selection and training 406: This phase may include selecting an appropriate machine learning algorithm and training it on the preprocessed data. This phase may further involve splitting the data into training and testing sets, using cross-validation to evaluate the model, and tuning hyperparameters to improve performance.

Model evaluation 408: This phase may include evaluating the performance of a trained model (e.g., the trained machine-learning program 502) on a separate testing dataset. This phase can help determine if the model is overfitting or underfitting and determine whether the model is suitable for deployment.

Prediction 410: This phase involves using a trained model (e.g., trained machine-learning program 502) to generate predictions on new, unseen data.

Validation, refinement or retraining 412: This phase may include updating a model based on feedback generated from the prediction phase, such as new data or user feedback.

Deployment 414: This phase may include integrating the trained model (e.g., the trained machine-learning program 502) into a more extensive system or application, such as a web service, mobile app, or IoT device. This phase can involve setting up APIs, building a user interface, and ensuring that the model is scalable and can handle large volumes of data.

FIG. 5 illustrates further details of two example phases, namely a training phase 504 (e.g., part of the model selection and trainings 406) and a prediction phase 510 (part of prediction 410). Prior to the training phase 504, feature engineering 404 is used to identify features 508. This may include identifying informative, discriminating, and independent features for effectively operating the trained machine-learning program 502 in pattern recognition, classification, and regression. In some examples, the training data 506 includes labeled data, known for pre-identified features 508 and one or more outcomes. Each of the features 508 may be a variable or attribute, such as an individual measurable property of a process, article, system, or phenomenon represented by a data set (e.g., the training data 506). Features 508 may also be of different types, such as numeric features, strings, and graphs, and may include one or more of content 512, concepts 514, attributes 516, historical data 518, and/or user data 520, merely for example.

In training phase 504, the machine-learning pipeline 500 uses the training data 506 to find correlations among the features 508 that affect a predicted outcome or prediction/inference data 522.

With the training data 506 and the identified features 508, the trained machine-learning program 502 is trained during the training phase 504 during machine-learning program training 524. The machine-learning program training 524 appraises values of the features 508 as they correlate to the training data 506. The result of the training is the trained machine-learning program 502 (e.g., a trained or learned model).

Further, the training phase 504 may involve machine learning, in which the training data 506 is structured (e.g., labeled during preprocessing operations). The trained machine-learning program 502 implements a neural network 526 capable of performing, for example, classification and clustering operations. In other examples, the training phase 504 may involve deep learning, in which the training data 506 is unstructured, and the trained machine-learning program 502 implements a deep neural network 526 that can perform both feature extraction and classification/clustering operations.

In some examples, a neural network 226 may be generated during the training phase 504, and implemented within the trained machine-learning program 502. The neural network 526 includes a hierarchical (e.g., layered) organization of neurons, with each layer consisting of multiple neurons or nodes. Neurons in the input layer receive the input data, while neurons in the output layer produce the final output of the network. Between the input and output layers, there may be one or more hidden layers, each consisting of multiple neurons.

Each neuron in the neural network 526 operationally computes a function, such as an activation function, which takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, affecting their performance on different tasks. The layered organization of neurons and the use of activation functions and weights enable neural networks to model complex relationships between inputs and outputs, and to generalize to new inputs that were not seen during training.

In some examples, the neural network 526 may also be one of several different types of neural networks, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 504, a validation phase may be performed on a separate dataset known as the validation dataset. The validation dataset is used to tune the hyperparameters of a model, such as the learning rate and the regularization parameter. The hyperparameters are adjusted to improve the model's performance on the validation dataset.

Once a model is fully trained and validated, in a testing phase, the model may be tested on a new dataset. The testing dataset is used to evaluate the model's performance and ensure that the model has not overfitted the training data.

In prediction phase 510, the trained machine-learning program 502 uses the features 508 for analyzing query data 528 to generate inferences, outcomes, or predictions, as examples of a prediction/inference data 522. For example, during prediction phase 510, the trained machine-learning program 502 generates an output. Query data 528 is provided as an input to the trained machine-learning program 502, and the trained machine-learning program 502 generates the prediction/inference data 522 as output, responsive to receipt of the query data 528.

In some examples, the trained machine-learning program 502 may be a generative AI model. Generative AI is a term that may refer to any type of artificial intelligence that can create new content from training data 506. For example, generative AI can produce text, images, video, audio, code, or synthetic data similar to the original data but not identical.

Some of the techniques that may be used in generative AI are:

Convolutional Neural Networks (CNNs): CNNs may be used for image recognition and computer vision tasks. CNNs may, for example, be designed to extract features from images by using filters or kernels that scan the input image and highlight important patterns.

Recurrent Neural Networks (RNNs): RNNs may be used for processing sequential data, such as speech, text, and time series data, for example. RNNs employ feedback loops that allow them to capture temporal dependencies and remember past inputs.

Generative adversarial networks (GANs): GNNs may include two neural networks: a generator and a discriminator. The generator network attempts to create realistic content that can "fool" the discriminator network, while the discriminator network attempts to distinguish between real and fake content. The generator and discriminator networks compete with each other and improve over time.

Variational autoencoders (VAEs): VAEs may encode input data into a latent space (e.g., a compressed representation) and then decode it back into output data. The latent space can be manipulated to generate new variations of the output data. VAEs may use self-attention mechanisms to process input data, allowing them to handle long text sequences and capture complex dependencies.

Transformer models: Transformer models may use attention mechanisms to learn the relationships between different parts of input data (such as words or pixels) and generate output data based on these relationships. Transformer models can handle sequential data, such as text or speech, as well as non-sequential data, such as images or code.

In generative AI examples, the output prediction/inference data 222 include predictions, translations, summaries or media content.

Figure 6:
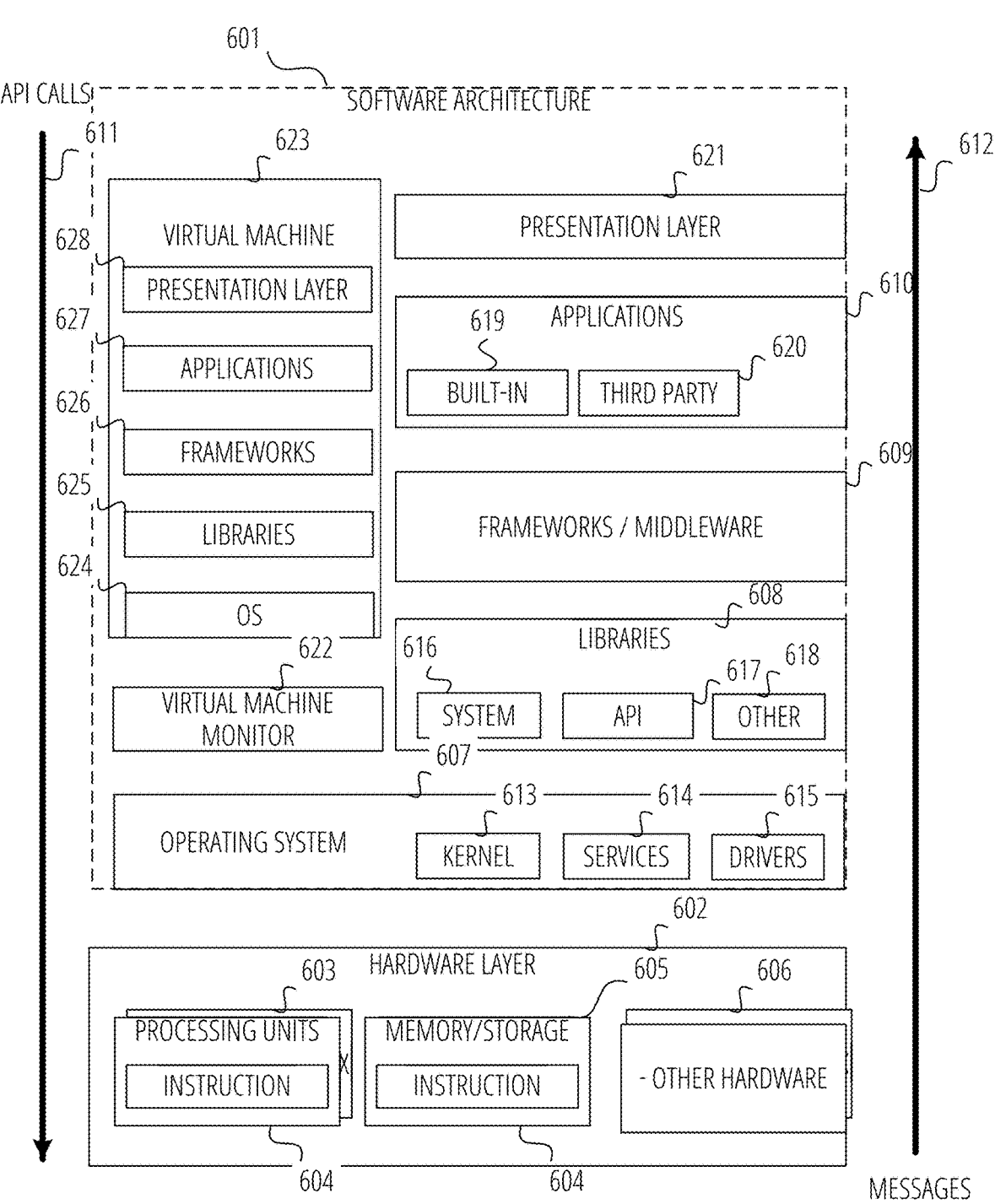
FIG. 6 is a block diagram illustrating a representative software architecture, which may be used in conjunction with various hardware architectures herein described, according to various examples of the present disclosure.

FIG. 6 is a block diagram illustrating an example of a software architecture 631 that may be installed on a machine, according to some examples. FIG. 6 is merely a non-limiting example of software architecture, and it will be appreciated that many other architectures may be implemented to facilitate the functionality described herein. The software architecture 631 may be executing on hardware such as a machine 701 of FIG. 7 that includes, among other things, processors 703, memory 707, and input/output (I/O) components 712. A representative hardware layer 602 is illustrated and can represent, for example, the machine 701 of FIG. 7. The representative hardware layer 602 comprises one or more processing units 603 having associated executable instructions 604. The executable instructions 604 represent the executable instructions of the software architecture 601. The hardware layer 602 also includes memory or storage modules 605, which also have the executable instructions 604. The hardware layer 602 may also comprise other hardware 606, which represents any other hardware of the hardware layer 602, such as the other hardware illustrated as part of the machine 701.

In the example architecture of FIG. 6, the software architecture 601 may be conceptualized as a stack of layers, where each layer provides particular functionality. For example, the software architecture 601 may include layers such as an operating system 607, libraries 608, frameworks/middleware 609, applications 610, and a presentation layer 621. Operationally, the applications 610 or other components within the layers may invoke API calls 611 through the software stack and receive a response, returned values, and so forth (illustrated as messages 612) in response to the api calls 611. The layers illustrated are representative in nature, and not all software architectures have all layers. For example, some mobile or special-purpose operating systems may not provide a frameworks/middleware 609 layer, while others may provide such a layer. Other software architectures may include additional or different layers.

The operating system 607 may manage hardware resources and provide common services. The operating system 607 may include, for example, a kernel 613, services 614, and drivers 615. The kernel 613 may act as an abstraction layer between the hardware and the other software layers. For example, the kernel 613 may be responsible for memory management, processor management (e.g., scheduling), component management, networking, security settings, and so on. The services 614 may provide other common services for the other software layers. The drivers 615 may be responsible for controlling or interfacing with the underlying hardware. For instance, the drivers 615 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 608 may provide a common infrastructure that may be utilized by the applications 610 and/or other components and/or layers. The libraries 608 typically provide functionality that allows other software modules to perform tasks in an easier fashion than by interfacing directly with the underlying operating system 607 functionality (e.g., kernel 613, services 614, or drivers 615). The libraries 608 may include system libraries 616 (e.g., C standard library) that may provide functions such as memory allocation functions, string manipulation functions, mathematic functions, and the like. In addition, the libraries 608 may include API libraries 617 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 608 may also include a wide variety of other libraries 618 to provide many other APIs to the applications 610 and other software components/modules.

The frameworks 609 (also sometimes referred to as middleware) may provide a higher-level common infrastructure that may be utilized by the applications 610 or other software components/modules. For example, the frameworks 609 may provide various graphical user interface functions, high-level resource management, high-level location services, and so forth. The frameworks 609 may provide a broad spectrum of other APIs that may be utilized by the applications 610 and/or other software components/modules, some of which may be specific to a particular operating system or platform.

The applications 610 include built-in applications 619 and/or third-party applications 620. Examples of representative built-in applications 619 may include, but are not limited to, a home application, a contacts application, a browser application, a book reader application, a location application, a media application, a messaging application, or a game application.

The third-party applications 620 may include any of the built-in applications 619, as well as a broad assortment of other applications. In a specific example, the third-party applications 620 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 620 may invoke the api calls 611 provided by the mobile operating system such as the operating system 607 to facilitate functionality described herein.

The applications 610 may utilize built-in operating system functions (e.g., kernel 613, services 614, or drivers 615), libraries (e.g., system libraries 616, API libraries 617, and other libraries 618), or frameworks/middleware 609 to create user interfaces to interact with users of the system. Alternatively, or additionally, in some systems, interactions with a user may occur through a presentation layer, such as the presentation layer 621. In these systems, the application/module "logic" can be separated from the aspects of the application/module that interact with the user.

Some software architectures utilize virtual machines. In the example of FIG. 6, this is illustrated by a virtual machine 623. The virtual machine 623 creates a software environment where applications/modules can execute as if they were executing on a hardware machine (e.g., the machine 701 of FIG. 7). The virtual machine 623 is hosted by a host operating system (e.g., the operating system 607) and typically, although not always, has a virtual machine monitor 622, which manages the operation of the virtual machine 623 as well as the interface with the host operating system (e.g., the operating system 607). A software architecture executes within the virtual machine 623, such as an operating system 624, libraries 625, frameworks 626, applications 627, or a presentation layer 628. These layers of software architecture executing within the virtual machine 623 can be the same as corresponding layers previously described or may be different.

Figure 7:
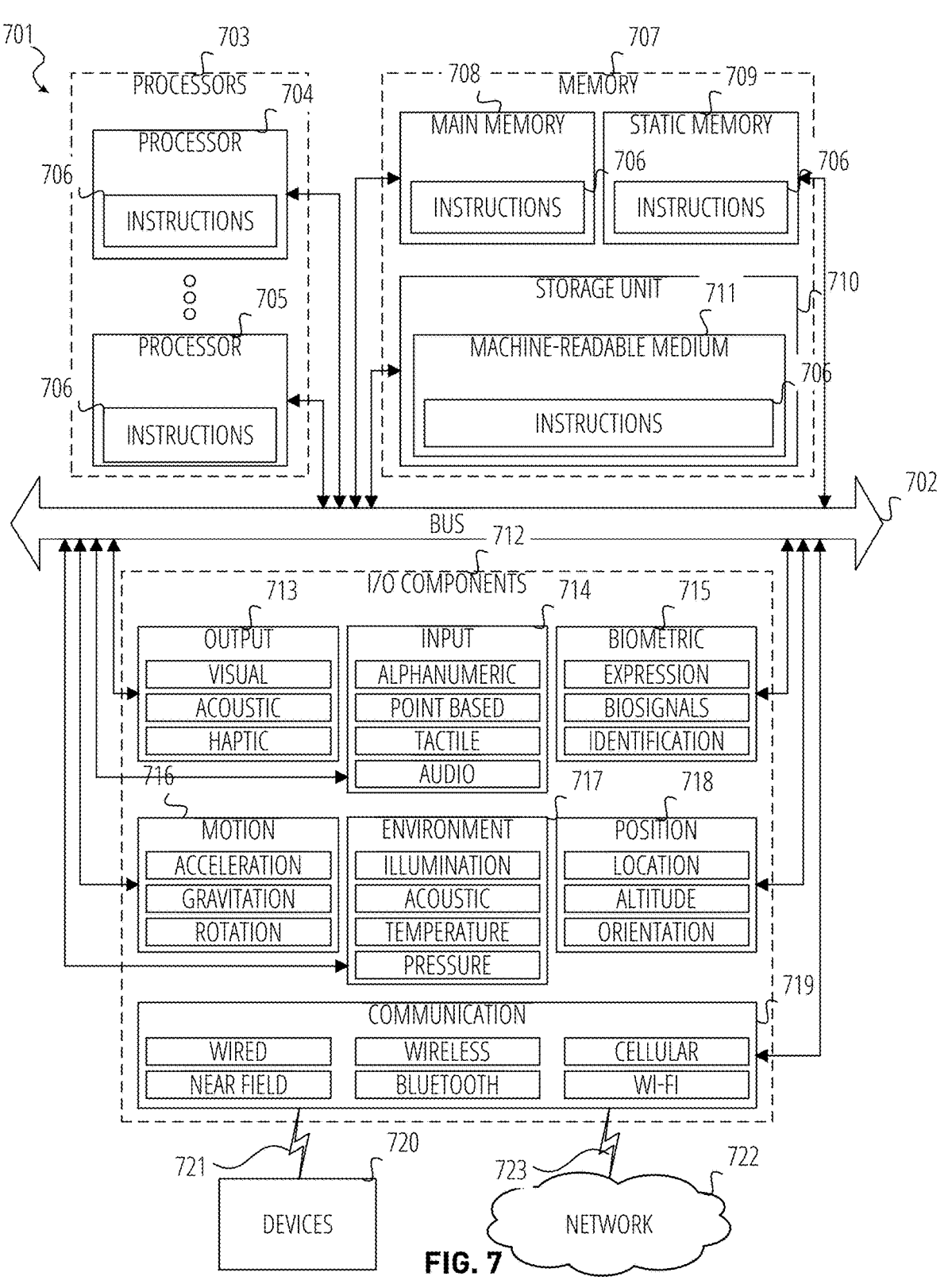
FIG. 7 is a block diagram illustrating components of a machine able to read instructions from a machine storage medium and perform any one or more of the methodologies discussed herein according to various examples of the present disclosure.

FIG. 7 illustrates a diagrammatic representation of a machine 701 in the form of a computer system within which a set of instructions may be executed for causing the machine 701 to perform any one or more of the methodologies discussed herein, according to some examples. Specifically, FIG. 7 shows a diagrammatic representation of the machine 701 in the example form of a computer system, within which instructions 706 (e.g., software, a program, an application, an applet, an app, or other executable code) for causing the machine 701 to perform any one or more of the methodologies discussed herein may be executed. For example, the instructions 706 may cause the machine 701 to execute the 300 or the machine-learning pipeline 500 described above. The instructions 706 transform the general, non-programmed machine 701 into a particular machine 701 programmed to carry out the described and illustrated functions in the manner described. In alternative examples, the machine 701 operates as a standalone device or may be coupled (e.g., networked) to other machines. In a networked deployment, the machine 701 may operate in the capacity of a server machine or a client machine in a server-client network environment, or as a peer machine in a peer-to-peer (or distributed) network environment. The machine 701 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 706, sequentially or otherwise, that specify actions to be taken by the machine 701. Further, while only a single machine 701 is illustrated, the term "machine" shall also be taken to include a collection of machines 701 that individually or jointly execute the instructions 706 to perform any one or more of the methodologies discussed herein.

The machine 701 may include processors 703, memory 707, and i/o components 712, which may be configured to communicate with each other such as via a bus 702. In an example, the processors 703 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 704 and a processor 705 that may execute the instructions 706. The term "processor" is intended to include multi-core processors that may comprise two or more independent processors (sometimes referred to as "cores") that may execute instructions contemporaneously. Although FIG. 7 shows multiple processors 703, the machine 701 may include a single processor with a single core, a single processor with multiple cores (e.g., a multi-core processor), multiple processors with a single core, multiple processors with multiples cores, or any combination thereof.

The memory 707 may include a main memory 708, a static memory 709, and a storage unit 710 including machine-readable medium 711, each accessible to the processors 703 such as via the bus 702. The main memory 708, the static memory 709, and the storage unit 710 store the instructions 706 embodying any one or more of the methodologies or functions described herein. The instructions 706 may also reside, completely or partially, within the main memory 708, within the static memory 709, within the storage unit 710, within at least one of the processors 703 (e.g., within the processor's cache memory), or any suitable combination thereof, during execution thereof by the machine 701.

The i/o components 712 may include a wide variety of components to receive input, provide output, produce output, transmit information, exchange information, capture measurements, and so on. The specific i/o components 712 that are included in a particular machine will depend on the type of machine. For example, portable machines such as mobile phones will likely include a touch input device or other such input mechanisms, while a headless server machine will likely not include such a touch input device. It will be appreciated that the i/o components 712 may include many other components that are not shown in FIG. 7. The i/o components 712 are grouped according to functionality merely for simplifying the following discussion, and the grouping is in no way limiting. In some examples, the i/o components 712 may include output components 713 and input components 714. The output components 713 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 714 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the i/o components 712 may include biometric components 715, motion components 716, environmental components 717, or position components 718, among a wide array of other components. The motion components 716 may include acceleration sensor components (e.g., accelerometer), gravitation sensor components, rotation sensor components (e.g., gyroscope), and so forth. The environmental components 717 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 718 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The i/o components 712 may include communication components 719 operable to couple the machine 701 to a network 722 or devices 720 via a coupling 723 and a coupling 721, respectively. For example, the communication components 719 may include a network interface component or another suitable device to interface with the network 722. In further examples, the communication components 719 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 719 may detect identifiers or include components operable to detect identifiers. For example, the communication components 719 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, Ultra Code, UCC RSS-2D bar code, and other optical codes), or acoustic detection components (e.g., microphones to identify tagged audio signals). In addition, a variety of information may be derived via the communication components 719, such as location via Internet Protocol (IP) geolocation, location via Wi-Fi® signal triangulation, location via detecting an NFC beacon signal that may indicate a particular location, and so forth.

Certain examples are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some examples, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In examples in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 701 including processors 703), with these operations being accessible via a network (e.g., the Internet) and via one or more appropriate interfaces (e.g., an API). In certain embodiments, for example, a client device may relay or operate in communication with cloud computing systems and may access circuit design information in a cloud environment.

The performance of certain of the operations may be distributed among the processors, not only residing within a single machine 701, but deployed across a number of machines 701. In some examples, the processors 703 or processor-implemented modules are located in a single geographic location (e.g., within a home environment, an office environment, or a server farm). In other example embodiments, the processors or processor-implemented modules are distributed across a number of geographic locations.

The various memories (i.e., 707, 708, 709, and/or the memory of the processor(s) 703) and/or the storage unit 710 may store one or more sets of instructions 706 and data structures (e.g., software) embodying or utilized by any one or more of the methodologies or functions described herein. These instructions (e.g., the instructions 706), when executed by the processor(s) 703, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 706 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media, at least some of which are covered under the term "signal medium" discussed below.

In some examples, one or more portions of the network 722 may be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 722 or a portion of the network 722 may include a wireless or cellular network, and the coupling 723 may be a Code Division Multiple Access (CDMA) connection, a Global System for Mobile communications (GSM) connection, or another type of cellular or wireless coupling. In this example, the coupling 723 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 720. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

Specific example embodiments are now described. In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

1. A method, e.g., for for managing input context limitations in large language model code generation systems, comprising:

receiving a code generation task;

identifying at least one code from a plurality of codes relevant to the code generation task;

for each identified code:

generating a map of relationships between functions, statements and data structures in the identified code by traversing a syntax tree for the identified code, the syntax tree for the identified code comprising a hierarchy of nodes, each node comprising at least one identifying name (such as instruction name, variable name, data structure name or parameter name);

modifying nodes of the syntax tree of the identified node by truncating code unrelated to the code generation task to generate a modified syntax tree for the identified code; and traversing the at least one modified syntax tree to generate a second code that is shorter than at least one identified code;

providing the generated second code, the at least one modified syntax tree, and the code generation task as input to a language model to generate output code; and executing the output code generated by the language model on computing device or storing the output code in a non-transitory computer-readable medium, the output code, when executed by a computer processor, configured to perform the requested task.

2. The method of example 1, further comprising validating the output code.

3. The method of example 2, further comprising:
identifying error locations in the second code;
searching the syntax tree adjacent the error locations;
following references to related code of the plurality of codes; and
providing the related code as additional context to the language model.

4. The method of example 3, wherein the following the references is based on available prompt context size of the language model.

5. The method of example 3, further comprising:
adding to the modified syntax tree, for each modified node, a new node indicating that the modified node is truncated; and rebuilding the context by deleting prior context and providing the generated second code, information related to the added nodes as context to the language model, the received code generation task, and the related code as context to the language model.

6. The method of example 2, wherein the validating includes identifying code structure violations using pattern recognition on the syntax trees.

7. The method of any of the preceding examples, wherein the modifying nodes includes removing function implementations while retaining function names and function parameters; replacing one or more functions with a comment that summarizes the functions that were replaced; or replacing a group or class of functions with a simplified version.

8. The method of any of the preceding examples, further comprising following references to third-party dependencies and including them in the map based on release dates of the dependencies compared to a knowledge cutoff date of the language model.

9. The method of any of the preceding examples, wherein identifying at least one code relevant to the code generation task comprises:
performing keyword-based search on the plurality of codes; and
using a re-ranking language model to select most relevant codes from the keyword-based search.

10. The method of example 9, wherein identifying at least one code further comprises performing semantic search using vector embeddings on the plurality of codes.

11. The method of any of the preceding examples, wherein the modifying is performed based on available prompt context size limitations of the language model to prevent context window overflow while maintaining code relationships.

12. The method of any of the preceding examples, further comprising rebuilding input by purging previous failed attempts and maintaining only current relevant code versions to prevent degradation of language model output quality.

13. The method of any of the preceding examples, further comprising responsive to compilation errors in the output code, identifying error locations in the syntax tree, following dependency references to related code sections, and providing the related code as additional input for error correction.

14. An apparatus comprising at least one processor and a memory configured to cause the processor to execute a method of any of the preceding examples.

15. A computer-readable medium having stored thereon instructions to cause at least one processor to execute a method of any of the preceding examples.

In conclusion, this disclosure presents a significant advancement in artificial intelligence-assisted software development by introducing a novel method for intelligent context management in large language model-based code generation systems. The disclosure addresses a critical technical challenge in the field: how to provide LLMs with sufficient contextual information from large, complex code-bases without overwhelming the model's processing capabilities or introducing confusion through irrelevant code segments. Through the use of syntax tree manipulation and code truncation, the disclosed method enables LLMs to generate more accurate and contextually appropriate code by receiving optimally compressed input that preserves essential structural relationships while eliminating unnecessary details. The system's ability to generate comprehensive maps of relationships between functions, statements, and data structures, combined with its transparent truncation marking mechanism, ensures that the language model maintains awareness of the broader codebase context even when working with simplified representations. This approach represents a substantial improvement over existing methods that either provide insufficient context or overwhelm LLMs with excessive information, thereby enabling more reliable and efficient automated code generation for real-world software development scenarios.

What is claimed is:
1. A method comprising:
receiving a code generation task;
identifying at least one code from a plurality of codes relevant to the code generation task;
generating at least one snippet for each of the at least one identified code, wherein each of the at least one snippet is shorter than the at least one corresponding identified code that each at least one snippet is generated for;
providing the at least one snippet of the at least one identified code and the code generation task as input context to a language model to generate output code;
validating the output code on a computing device; and
responsive to an error during the validating, rebuilding the input context by generating new snippets from the at least one identified code and from additional code of the plurality of codes identified based on the error, and providing the rebuilt input context to the language model to generate new output code.

2. The method of claim 1, further comprising validating the output code and executing the validated output code.

3. The method of claim 1, wherein the plurality of codes comprises previously written code from a codebase.

4. The method of claim 1, wherein generating at least one snippet comprises replacing one or more functions with a comment that summarizes the one or more functions that were replaced.

5. The method of claim 1, wherein identifying at least one code comprises using Large Language Model-assisted classification to determine which source code files are relevant to the code generation task.

6. The method of claim 1, further comprising:
rebuilding the input context by purging previous failed code generation attempts; and
maintaining only current relevant code versions to prevent degradation of language model output quality.

7. The method of claim 1, wherein generating the at least one snippet comprises:
creating an abridged version of the at least one identified code by truncating the at least one identified code; and
inserting explanatory text indicating where code has been truncated.

8. The method of claim 1, wherein identifying at least one code relevant to the code generation task comprises:
performing a keyword-based search on the plurality of codes; and
using a re-ranking language model to select at least one code based on the keyword-based search.

9. The method of claim 8, wherein identifying at least one code further comprises performing a semantic search using vector embeddings on the plurality of codes.

10. A non-transitory computer readable medium having stored thereon instructions to configure at least one processor to:
receive a code generation task;
identify at least one code from a plurality of codes relevant to the code generation task;
generate at least one snippet for each of the at least one identified code, wherein each of the at least one snippet is shorter than the at least one corresponding identified code that each at least one snippet is generated for;
provide the at least one snippet of the at least one identified code and the code generation task as input context to a language model to generate output code;
validate the output code on a computing device; and
responsive to an error during the validating, rebuild the input context by generating new snippets from the at least one identified code and from additional code of the plurality of codes identified based on the error, and provide the rebuilt input context to the language model to generate new output code.

11. A computing apparatus comprising:
at least one processor; and
a memory storing instructions that, when executed by the at least one processor, configure the apparatus to:
receive a code generation task;
identify at least one code from a plurality of codes relevant to the code generation task;
generate at least one snippet for each of the at least one identified code, wherein each of the at least one snippet is shorter than the at least one corresponding identified code that each at least one snippet is generated for;
provide the at least one snippet of the at least one identified code and the code generation task as input context to a language model to generate output code;
validate the output code on a computing device; and
responsive to an error during the validating, rebuild the input context by generating new snippets from the at least one identified code and from additional code of the plurality of codes identified based on the error, and provide the rebuilt input context to the language model to generate new output code.

12. The computing apparatus of claim 11, wherein the instructions further configure the apparatus to validate the output code and executing the validated output code.

13. The computing apparatus of claim 11, wherein the plurality of codes comprises previously written code from a codebase.

14. The computing apparatus of claim 11, wherein generating at least one snippet comprises replacing one or more source code statements or instructions with a comment that summarizes the one or more source code statements or instructions that were replaced.

15. The computing apparatus of claim 11, wherein identifying at least one code comprises using Large Language Model-assisted classification to determine source code files are relevant to the code generation task.

16. The computing apparatus of claim 11, wherein the instructions further configure the apparatus to:
rebuild the input context by purging previous failed code generation attempts; and
maintain only current relevant code versions to prevent degradation of language model output quality.

17. The computing apparatus of claim 11, wherein generating the at least one snippet comprises:
creating an abridged version of the identified code by truncating the at least one identified code; and
inserting explanatory text indicating where code has been truncated.

18. The computing apparatus of claim 11, wherein identifying at least one code relevant to the code generation task comprises:
performing a keyword-based search on the plurality of codes; and
using a re-ranking language model to select at least on code based on the keyword-based search.

19. The computing apparatus of claim 18, wherein identifying at least one code further comprises performing a semantic search using vector embeddings on the plurality of codes.

20. The computing apparatus of claim 11, wherein generating at least one snippet comprises dynamically adjusting an amount of detail based on at least one of:
available context window size of the language model;
desired processing speed;
desired output quality; or
processing cost.

* * * * *